W. STEPHENS & H. M. GASTON.
SPRING WHEEL FOR AUTOMOBILES AND OTHER VEHICLES.
APPLICATION FILED NOV. 2, 1910.
1,035,058.
Patented Aug. 6, 1912.
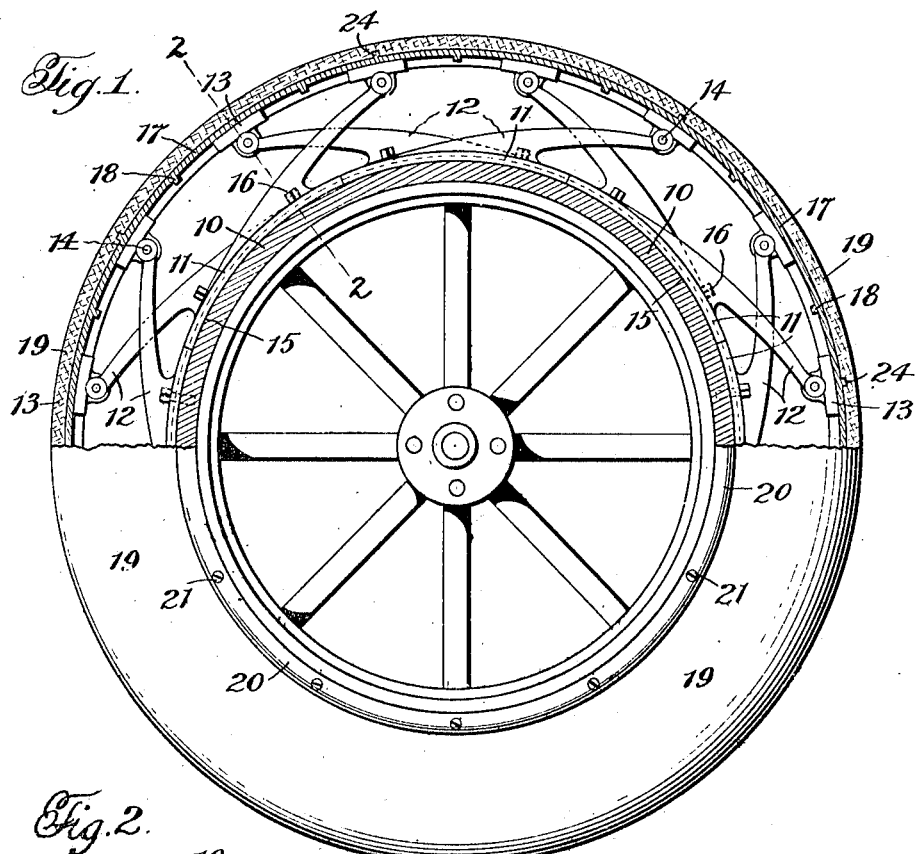
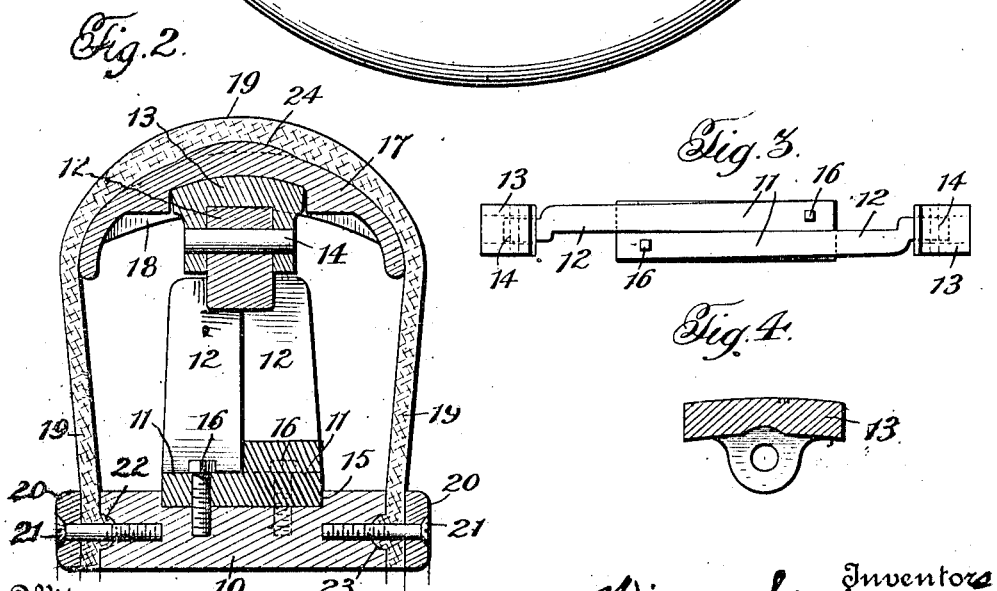
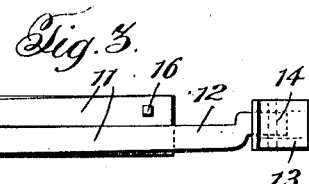
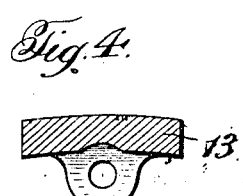

UNITED STATES PATENT OFFICE.

WINSTON STEPHENS, OF NEW BEDFORD, MASSACHUSETTS, AND HORACE M. GASTON, OF NEWPORT, RHODE ISLAND.

SPRING-WHEEL FOR AUTOMOBILES AND OTHER VEHICLES.

1,035,058.  Specification of Letters Patent.  Patented Aug. 6, 1912.

Application filed November 2, 1910. Serial No. 590,383.

*To all whom it may concern:*

Be it known that we, WINSTON STEPHENS, of New Bedford, in the county of Bristol and State of Massachusetts, and HORACE M. GASTON, of Newport, in the county of Newport and in the State of Rhode Island, have invented a certain new and useful Improvement in Spring-Wheels for Automobiles and other Vehicles, and do hereby declare that the following is a full, clear, and exact description thereof.

The object of our invention is to provide a satisfactory substitute for the pneumatic tire in common use on automobiles which will possess all the elasticity and resiliency required, but will be free from the serious disadvantages, such as liability to puncture or collapse, that inhere in the pneumatic tire.

While we have had in view the production of a tire more especially intended for automobiles, it will be understood that we do not limit ourselves to the use of our invention on any particular vehicle.

For the attainment of the objects of our invention, said invention consists in the spring wheel constructed substantially as hereinafter specified and claimed.

Referring to the accompanying drawings—Figure 1 is a vertical section through a spring wheel, on a plane at right angle to the wheel axis, which is an embodiment of our invention; Fig. 2 a cross section on line 2—2 of Fig. 1; Fig. 3 a detail plan view of a pair of contiguous spring members which we use, and Fig. 4 is a detail view in section of one of the shoes.

In producing our invention we have had in view the production of a yielding or cushion device that may be applied to the rim or felly of the wheel, and we, therefore, employ an annulus or ring 10, preferably, of steel, of a diameter and width to fit the felly and to which it is secured. Applied to the periphery or outer circumference, of the ring 10 and extending in a complete circular series around the same are elastic or spring members, each of which consists of a base plate 11 curved in correspondence with the arc of curvature of the periphery of the ring 10 and a pair of stout spring arms 12 that are integral with the base plate and project in tangential directions but oppositely to each other, said spring arms being connected with the base at opposite sides thereof and alongside of each other thereat, and each at its outer free end has attached to it a block or shoe 13. The oppositely extending arms of adjacent base plates 11 lap past each other, as clearly shown in Fig. 1, and thus the spring arms 12 can be of considerable length so that they may have both strength and elasticity and at their free ends form numerous supporting points for the tire. Each block or shoe 13 is pivotally attached to its spring arm, as by means of a pivot pin 14, which passes through lugs or ears on opposite sides of the free end portion of the spring arm and, preferably, the arm end is convexly rounded concentric with the pivot pin and a corresponding concave surface is provided on the block or shoe 13 so that the engagement of the convexly and concavely rounded surfaces will result in strain being taken off the comparatively light pivot pin. The base plates 11 are preferably seated in a circumferential groove or recess 15 in the outer circumference or periphery of the felly-engaging ring 10, and they are secured to the latter conveniently by means of bolts 16 passing through said base plate and into tapped openings in said ring 10.

Normally the spring-supported blocks or shoes 13 are the same radial distance from the center of the wheel and they engage and support an encircling rim or tire 17, preferably, though not necessarily, of metal, said tire being as shown convex on its outer circumference in cross section, and being grooved on its inner circumference to form an annular guideway for the shoes so that the latter may slide in a circumferential direction freely with reference to said tire when, by reason of the weight on the wheel, the spring members vibrate or move to and fro.

On the inner circumference of the tire 17, between adjacent shoes, we preferably provide inwardly projecting stop lugs 18 in the form of transversely extending ribs which being engaged by the shoes prevent excessive inward movement of said tire and its yielding supporting system.

We preferably inclose the tire 17 and its yielding supporting system of spring devices by a sheath or covering 19, preferably of rubber, that has a tire-forming portion that fits over the tire 17 and at each side a side portion that extends from the tire 17 inward to the metal ring 10 to which it is securedly attached by a clamping ring 20 that engages it on the outside through which fastening screws 21 pass into the ring 10, and by means of a rib-like projection 22 on the inner side that is seated in a recess or cavity 23 in the side of the ring 10. Preferably, to prevent any creeping or sliding of the portion of the rubber sheath or cover that overlies the tire 17, we provide their contiguous surfaces with interlocking portions such, for example, as transverse lugs 24 on the periphery of the tire 17 and correspondingly shaped grooves or recesses in the inner wall of said tire-engaging portion of the sheath or cover.

It will be observed that there are two series of oppositely extending spring arms 12, and that all the arms of the same series extend in the same direction and aline with each other, the result being that the arms can be given an adequate length to secure the desired elasticity, and yet the arms be amply strong, a condition or result that would not be possible did alternate arms of the same series extend toward each other.

It will be understood our invention may be embodied in structures varying in details from that we have illustrated and described as one embodiment of our invention, and, therefore, we do not confine ourselves to any particular details of construction we have shown and described.

It must be evident, we think, that with our invention all required elasticity or springiness may be secured, and yet, with a structure that is strong and durable so as to be capable of successfully withstanding the rough usage required by automobiles and at the same time the appearance of wheels equipped with our invention is not impaired or detracted from, but on the contrary is pleasing.

Having thus described our invention what we claim is—

In a spring wheel, the combination of inner and outer ring-form members spaced apart radially, the inner member being a felly-engaging member, a flexible sheath attached at its inner edges at opposite sides of the inner ring-form member and inclosing the outer ring-form member, two circular series of spring arms within said sheath, interposed between said two members alongside of each other, all the arms of the same series extending in the same direction and opposite to the direction of the arms of the other series, a base plate with which a pair of oppositely extending arms are integral, bolts passing through the base plates into the inner ring-form member, said member having a groove receiving the circumferential series of base-plates, whereby the base plates are rigidly secured to the inner ring-form member, slidable shoes pivotally connected to the outer ends of the spring arm and bearing against the inner side of the outer ring-form member, and stop devices on the latter situated between adjacent shoes.

In testimony that we claim the foregoing we have hereunto set our hands.

WINSTON STEPHENS.
HORACE M. GASTON.

Witnesses:
LOUIS RUBENSTEIN,
MARCO A. RUSSO.

---

Copies of this patent may be obtained for five cents each, by addressing the "Commissioner of Patents, Washington, D. C."